United States Patent
Fleissner

(10) Patent No.: US 6,594,874 B1
(45) Date of Patent: Jul. 22, 2003

(54) METHOD AND DEVICE FOR STABILIZATION OF PILE GOODS SUCH AS PILE CARPET WITH A REINFORCING BACK AND PILE GOODS

(75) Inventor: Gerold Fleissner, Zug (CH)

(73) Assignee: Fleissner GmbH & Co., Maschinenfabrik, Egelsbach (DE)

( * ) Notice: Subject to any disclaimer, the term of this patent is extended or adjusted under 35 U.S.C. 154(b) by 291 days.

(21) Appl. No.: 09/649,571

(22) Filed: Aug. 29, 2000

(30) Foreign Application Priority Data

Sep. 1, 1999 (DE) ............................ 199 41 613
Sep. 24, 1999 (DE) ............................ 199 45 988

(51) Int. Cl.⁷ ................................... D04H 11/00
(52) U.S. Cl. ............................... 28/159; 28/104
(58) Field of Search ................... 28/104, 105, 159, 28/160, 107, 162, 167; 26/2 R; 428/95; 442/408

(56) References Cited

U.S. PATENT DOCUMENTS

| 3,394,043 | A | * | 7/1968 | Parlin et al. ................ 28/159 |
| 3,707,746 | A | * | 1/1973 | Summers .................... 28/104 |
| 3,751,777 | A | * | 8/1973 | Turmel et al. ............... 28/159 |
| 3,847,719 | A | * | 11/1974 | Crowley .................... 28/159 |
| 3,944,452 | A | * | 3/1976 | Toland et al. ................ 28/105 |
| 4,145,468 | A | * | 3/1979 | Mizoguchi et al. ........... 28/104 |
| 4,146,663 | A | * | 3/1979 | Ikeda et al. ................. 28/159 |
| 4,147,575 | A | * | 4/1979 | Hurtes ....................... 28/159 |
| 4,233,349 | A | * | 11/1980 | Niederhauser ............... 28/104 |
| 4,591,513 | A | * | 5/1986 | Suzuki et al. ................ 28/104 |
| 5,458,944 | A | | 10/1995 | Austin |
| 5,470,648 | A | | 11/1995 | Pearlman et al. |
| 5,789,328 | A | * | 8/1998 | Kurihara et al. ............. 28/104 |

FOREIGN PATENT DOCUMENTS

EP 0538625 4/1993

* cited by examiner

Primary Examiner—A. Vanatta
(74) Attorney, Agent, or Firm—Antonelli, Terry, Stout & Kraus, LLP

(57) ABSTRACT

A pile carpet after tufting or the like is usually provided on the back with a latex precoat for stabilization and then provided with a foam back or an additional jute fabric. This environmentally hazardous method and the problem of recycling the foam back as well as the latex layer can be avoided if a nonwoven is applied instead to the tufted back of the carpet by water needling. This is possible with water needling in that the solidification of the pile fibers in or on the primary carrier takes place but no nonwoven fibers reach the visible side of the carpet. The back layer to be needled can also be made thicker and more voluminous. Instead of a carpet, any other pile goods can also be stabilized in this fashion.

8 Claims, 1 Drawing Sheet

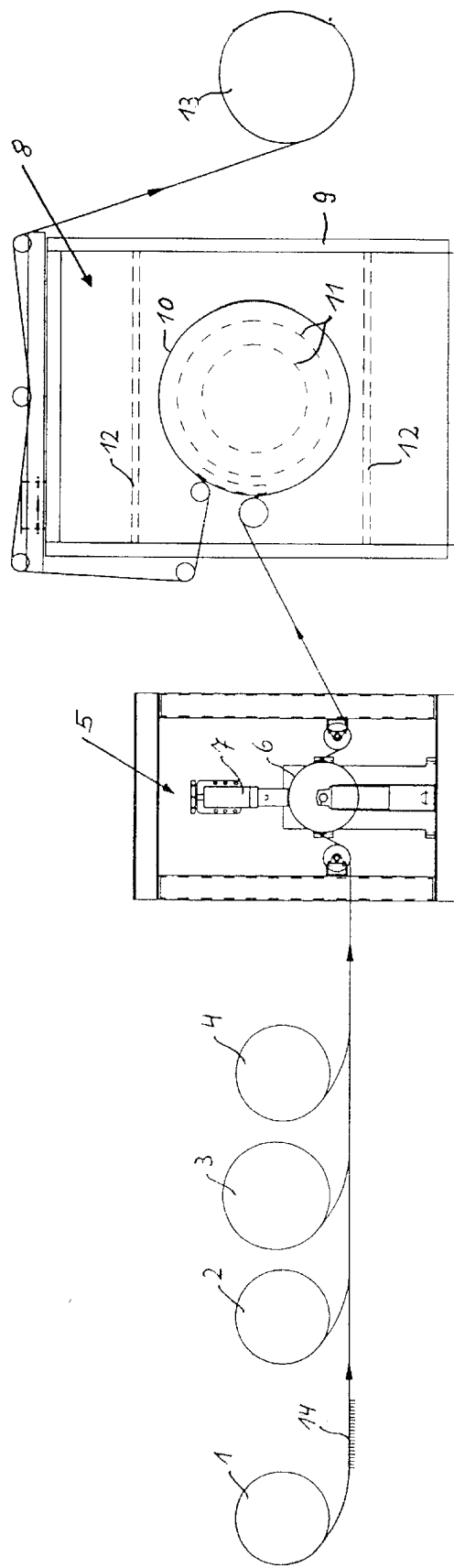

METHOD AND DEVICE FOR STABILIZATION OF PILE GOODS SUCH AS PILE CARPET WITH A REINFORCING BACK AND PILE GOODS

The back, for example of a tufted carpet, must serve primarily for firmly holding the pile fibers, since in tufting the pile fibers are placed in the primary carrier but can be pulled out easily once again. The back of the carpet must also provide a greater volume, a soft step, and good installation ability with dimensional stability. It is known that these conditions can be produced with a precoat made of latex which must cure. As the second coat, a jute cloth could then be applied. The second layer should also consist of a foam that must be vulcanized. These manufacturing methods are very costly and the product thus produced is environmentally hazardous when disposed of later.

The goal of the invention is to find a method with which the environmentally hazardous binder, foam, and required chemicals can be avoided. At the same time, the pile goods product, especially a carpet manufacturing system, must become cheaper and yet the pile goods must have all the necessary qualities.

To achieve this goal, provision is made such that preferably a nonwoven is fastened by hydrodynamic water needling to the back of a primary carrier that holds the pile fibers. It has been found that in water needling the fibers of the stabilizing nonwoven can be shot into the back of the primary carrier and into the pile fibers held there far enough that parts of the nonwoven that have a stabilizing effect are visible on the exterior of the pile, or on the roots of the pile of the web goods. The nonwoven is needled only with the pile fibers visible on the back side and reversed there and with the back of the primary carrier so that the pile fibers are stabilized in the back.

It is true that in practice a more stable and possibly also a more voluminous carpet is desirable than one that has only a lightweight nonwoven on the back. It is therefore advantageous in designing the method if a composite made of a lightweight nonwoven, a coarsely braided, dimensionally stable stability area element, and possibly also a lightweight nonwoven are combined and laid on the non-solidified back of the carpet and then connected in one work step with the back of the carpet using hydrodynamic water needling. Now the carpet has not only a solidified pile permanently held in the back but also the desired volume and, with the stability area element, the required dimensional stability as well. Such a stabilizing back layer can weigh up to 600 $g/m^2$.

Using the method according to the invention, a pile carpet with the desired quality properties can be manufactured more economically, one that has no chemicals relative to the design of the back so that recycling no longer poses any problems.

As a nonwoven for stabilizing the pile fibers, a carded nonwoven should be used which can be done without solidification and possibly also slight pre-solidification using water needling, and placed on the back of the primary carrier. Polyester, PP, PA, or other fibers can be used as the fibers. The nonwoven can have its thickness and weight adapted to the specific requirements and it should preferably have a weight of 100–200 $g/m^2$. Then this web material should pass beneath the beam of a water needling machine with the water pressure adjusted so that the fibers of the nonwoven are woven once, in other words the nonwoven or the composite acquires greater strength, but at the same time its fibers penetrate into the pile fibers bent in the back of the web goods and penetrate the primary carrier so that the pile web goods are stabilized without the pile being changed in any way. The water pressure must be adapted to the individual conditions. Pressures up to 600 bars can be used.

In the drawing, a machine is shown schematically as an example with which such web goods back solidification can be performed.

On reel 1, a web-shaped pile goods 14 is wound so that the visible side or the pile side, is directed downward. Web goods 14 can be a tufted carpet, plush goods, or other web goods that have a velvety surface. These web goods 14 run continuously through a water needling machine 5 which here consists of only a drum 6, which has only one water beam 7 above the drum. The web goods thus has the pile resting on drum 6. Before the web goods enter the hydrodynamic solidification device 5, its back side is covered with a nonwoven. This nonwoven is placed on the reel located above the advancing pile goods and unrolls at a constant speed that conforms to the speed of the pile goods. By means of hard water needling, the nonwoven is solidified in device 5, and its fibers are moved into the back and thus into the unbent pile fibers of the web goods as well. The pile fibers are thus held firmly in the primary carrier without having to be fixed by a latex precoating in the back. Water needling machine 5 can also consist of several drums 6 or an endless belt at which several water beams 7 are directed from above. Then the or the like must be dried, which in this example can be performed with an aerating screen drum dryer 8, since the web goods are still permeable to air. The screen drum dryer 8, as is known, consists of a drum 10 rotatably mounted in a housing 9 and associated endwise with a fan 11, which circulates the processing air over cover 12 in a circuit. The finished carpet is then wound up on reel 13.

The back layer of carpet to be applied can be a simple lightweight carded nonwoven with winder 2 or can consist of a composite that consists of two or three stabilizing web-shaped goods. For this purpose, winding rollers 3 and 4 are shown in the drawing and are likewise located outside the pile goods 14 next to reel 2. Dimensionally stable web goods made of a coarsely woven fabric or the like can leave reel 3 and a lightweight carded nonwoven can be unreeled from reel 4. All in all, they travel as the new back layer together with pile goods 14 into device 5 and are needled there firmly to the back of the pile goods. The goods supplemented in this manner are dimensionally stable and have a soft back as well as a pile anchored firmly in the back, which is not changed in its appearance by this solidification process.

What is claimed is:

1. A method for continuous stabilization of web-shaped goods with a visible side whose structure and quality must not be changed and with a back side which is initially still unstable, the method comprising providing a web-shaped product comprising pile-forming fibers held loosely in a primary carrier, providing a nonwoven on the back side of the primary carrier of the web-shaped product; and fastening the nonwoven by hydrodynamic water needling to the back side of the primary carrier holding the pile fibers, by penetrating fibers of the nonwoven into the pile fibers on the back side of the primary carrier, to stabilize the pile fibers without changing the structure and quality of the visible side.

2. The method according to claim 1, wherein the nonwoven is a carded nonwoven.

3. The method according to claim 1, wherein the nonwoven is a lightweight fiber nonwoven that weighs about 100–200 $g/m^2$ and is non-solidified or is only slightly pre-solidified or pre-needled.

4. The method according to claim 1, wherein the nonwoven is a composite comprising a first lightweight nonwoven layer and a coarsely woven, dimensionally stable layer, and the composite is connected in one work step with the back side of the primary carrier by hydrodynamic water needling.

5. The method according to claim 4, wherein the composite further comprises a second lightweight nonwoven layer on a side of the coarsely woven, dimensionally stable layer opposite the first lightweight nonwoven layer.

6. The method according to claim 1, wherein the pile fibers are in the form of yarns.

7. The method according to claim 6, wherein the yarns are tufted in the primary carrier.

8. The web-shaped goods produced by the process of claim 1.

* * * * *